(12) United States Patent
Morreale et al.

(10) Patent No.: US 9,869,193 B2
(45) Date of Patent: Jan. 16, 2018

(54) SEALING DEVICE BETWEEN TWO AXISYMMETRIC COAXIAL PARTS

(71) Applicant: SNECMA, Paris (FR)

(72) Inventors: Serge René Morreale, Guignes (FR); Arnaud Jean-Marie Pierrot, Le Mee sur Seine (FR)

(73) Assignee: SNECMA, Paris (FR)

( * ) Notice: Subject to any disclaimer, the term of this patent is extended or adjusted under 35 U.S.C. 154(b) by 723 days.

(21) Appl. No.: 14/371,864

(22) PCT Filed: Jan. 7, 2013

(86) PCT No.: PCT/FR2013/050030
§ 371 (c)(1),
(2) Date: Jul. 11, 2014

(87) PCT Pub. No.: WO2013/107962
PCT Pub. Date: Jul. 25, 2013

(65) Prior Publication Data
US 2015/0050130 A1    Feb. 19, 2015

(30) Foreign Application Priority Data

Jan. 16, 2012   (FR) .................................... 12 50376

(51) Int. Cl.
*F01D 11/00* (2006.01)
*F01D 11/02* (2006.01)
(Continued)

(52) U.S. Cl.
CPC .......... *F01D 11/003* (2013.01); *F01D 11/001* (2013.01); *F01D 11/02* (2013.01);
(Continued)

(58) Field of Classification Search
CPC ........ F01D 11/00; F01D 11/02; F01D 11/025; F04D 29/10; F04D 29/102; F04D 29/12; F04D 29/122; F16K 15/3272
See application file for complete search history.

(56) References Cited

U.S. PATENT DOCUMENTS 4,211,424 A    7/1980  Stein
4,426,087 A *  1/1984  Sargent .................. F16J 15/441
                                                277/422
(Continued)

FOREIGN PATENT DOCUMENTS

EP    1 911 998    4/2008
GB    2467734      8/2010

OTHER PUBLICATIONS

International Search Report issued for International Application No. PCT/FR2012/050030, dated Mar. 1, 2013.

*Primary Examiner* — Gregory Anderson
*Assistant Examiner* — Cameron Corday
(74) *Attorney, Agent, or Firm* — Pillsbury Winthrop Shaw Pittman LLP

(57) ABSTRACT

A sealing device between two axisymmetric coaxial parts, includes an elastic segment, two holding elements located on each side of the annular segment, an annular spacer arranged between the two holding elements, wherein the annular spacer has a notch around its peripheral rim; the annular elastic segment has a hooking element at each of its free ends, adapted to cooperate with the notch of the annular spacer, and to hold the elastic segment in a pre-holding position by elastic return force.

10 Claims, 3 Drawing Sheets

A-A

(51) Int. Cl.
*F16J 9/14* (2006.01)
*F16J 15/3272* (2016.01)
(52) U.S. Cl.
CPC ............. *F16J 9/14* (2013.01); *F16J 15/3272* (2013.01); *Y10T 29/49245* (2015.01)

(56) References Cited

U.S. PATENT DOCUMENTS

| | | | | |
|---|---|---|---|---|
| 4,754,984 | A | * | 7/1988 | Keba ...................... F16J 15/441 277/350 |
| 5,110,033 | A | | 5/1992 | Noone |
| 6,036,191 | A | * | 3/2000 | Millard .................. B62D 5/083 277/411 |
| 2010/0066027 | A1 | * | 3/2010 | Vasagar ................ F01D 11/003 277/350 |

* cited by examiner

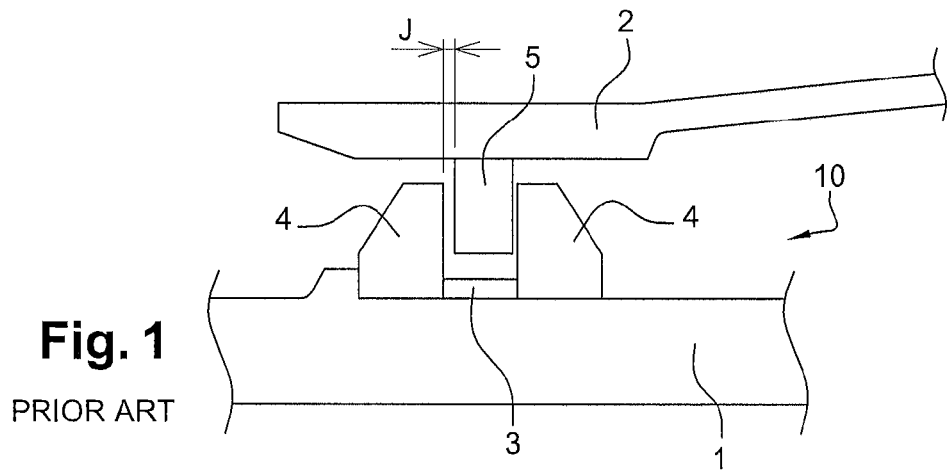
Fig. 1
PRIOR ART
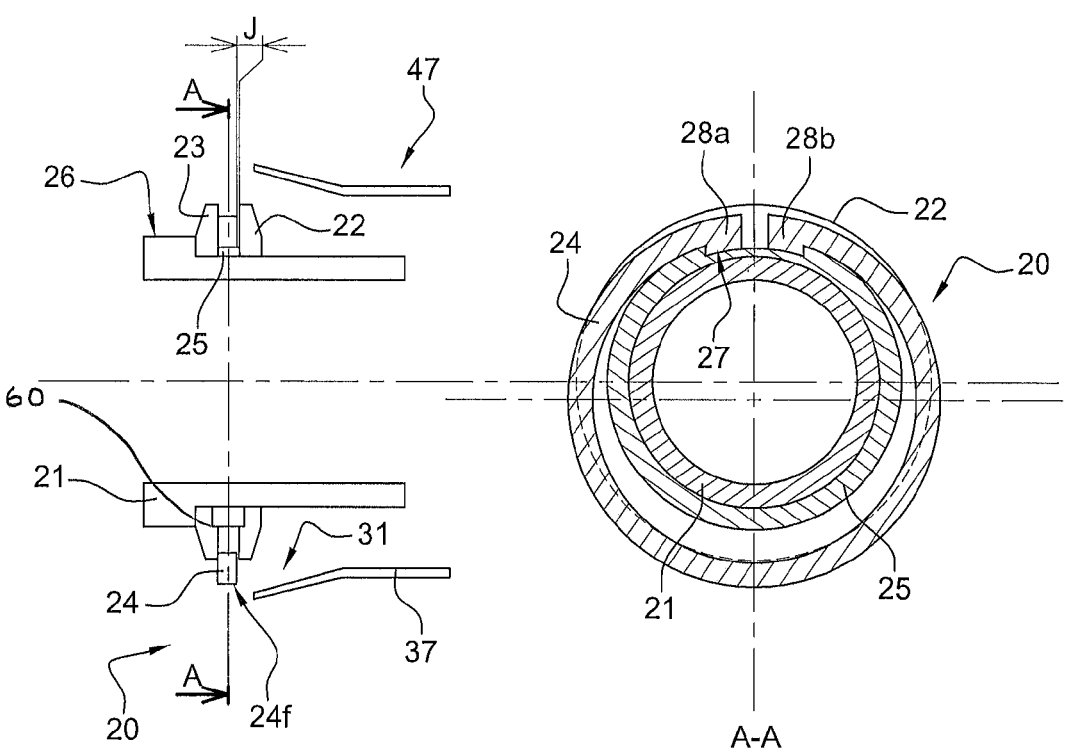
Fig. 2         Fig. 3

SEALING DEVICE BETWEEN TWO AXISYMMETRIC COAXIAL PARTS

CROSS REFERENCE TO RELATED APPLICATIONS

This application is the U.S. National Stage of PCT/FR2013/050030, filed Jan. 7, 2013, which in turn claims priority to French Patent Application No. 1250376 filed Jan. 16, 2012, the entire contents of all applications are incorporated herein by reference in their entireties.

TECHNICAL FIELD

This invention relates to the field of sealing systems between two axisymmetric coaxial parts and more particularly two coaxial rotating shafts.

This invention is more particularly applicable to a dynamic sealing device arranged between two coaxial rotating shafts of a turbomachine.

STATE OF THE ART

In the particular field of a turbomachine, there is a need to define and to isolate a chamber surrounding a mechanical device such as a roller bearing or a gear installed between two rotating shafts, for example such as the high pressure rotor and the low pressure rotor. Oil is injected into this chamber to lubricate and cool the mechanical device. In particular, isolation of the chamber requires particularly a sealing device between the two rotating shafts.

It is known that contactless sealing devices can be used in this type of application. However, contactless sealing devices of the labyrinth type require a high airflow and it is sometimes difficult to obtain the required pressurisation in the chamber. Furthermore, an air-oil mix is created in the chamber which requires a deoiling device before the air is evacuated. Therefore it is difficult to find a good compromise and these sealing devices cannot always achieve the required performances. Finally, this type of seal requires the presence of a deoiling device that is expensive, large and heavy due to the large oily airflow to be treated.

The use of contact sealing devices of the carbon seal type or the brush seal type is also known. Such a sealing device is shown diagrammatically in FIG. 1 as reference 10. The sealing device 10 comprises an open elastic carbon segment 5, two metal bearing surfaces 4 fixed to the inner shaft 1 and axially adjacent to the carbon segment 5 with a clearance J, the axial space between the two bearing surfaces being maintained by a spacer 3 wider than the carbon segment 5. Correct operation of the sealing device is achieved because the carbon segment 5 is prestressed as soon as the machine starts, so as to maintain contact with the outer shaft sealing end plate 2. The carbon segment 5 and the sealing end plate 2 must be fixed together during rotation of the two shafts.

The carbon segment 5 may be in contact with one of the metallic bearing surfaces 4, which implies wear of the device and consequently requires periodic replacement.

It is known that the carbon segment 5 can be made to rotate at the same speed as the outer shaft when the two rotating shafts are co-rotating, to limit wear of the sealing device.

On the other hand, when the two rotating shafts are counter rotating (i.e. when the two shafts are rotating in opposite directions), axial friction of the carbon segment 5 on one of the metal bearing surfaces 4 can slow the rotation of the carbon segment which is prejudicial for bringing the segment into contact onto the reaming of the outer shaft by centrifugal force.

Contact sealing devices comprising a larger diameter carbon segment (i.e. diameter larger than the diameter of the reaming of the sealing end plate) have been developed to overcome this problem, so as to improve the radial contact of the segment onto the outer shaft sealing end plate. Assembly difficulties are inherent to such a segment because it must be held compressed so that its position in the reaming in the sealing end plate can be determined without any risk of damage or breakage of the segment acting as the seal.

This segment compression operation may also be achieved through use of a ribbon wound around the carbon segment to hold it in a compressed state while the two rotating shafts are docked.

Since the environment of the sealing device becomes inaccessible once the two rotating shafts are docked, the ribbon is subsequently recovered through one of the ventilation holes in the rotating shaft. This operation is difficult and may or may not be possible depending on the environment of the sealing device.

GENERAL DESCRIPTION OF THE INVENTION

In this context, the invention aims at providing a sealing device between two axisymmetric parts, also adapted to function with co-rotating or counter rotating shafts, to dock two axisymmetric parts and more specifically two rotating shafts in contact with each other, without the need to use any tools or specific means (for example without the use of any ribbon).

To achieve this, the invention proposes a sealing device for use between two axisymmetric coaxial parts, said device comprising:
- an annular elastic segment with an angular opening;
- two holding means located on each side of said annular segment and adapted to hold said segment in position axially while allowing a limited axial displacement (J);
- an annular spacer arranged between said two holding means and adapted to hold said two holding means at a given spacing;

said device being characterised in that:
- said annular spacer has a notch around its peripheral rim;
- said annular elastic segment has hooking means at each of its free ends, adapted to cooperate with said notch of said annular spacer, and to hold said elastic segment in a position called the pre-holding position by elastic return force, in which the outside diameter of said elastic segment is less than the outside diameter of said elastic segment when it is in its free state and in which the central axis of said elastic segment is offset from the central axis of said annular spacer.

Thus, with the device according to the invention, there is no longer any need to use a special means to hold the elastic segment in a compressed state during the operation to bring two axisymmetric parts into contact.

Advantageously, the device according to the invention is a sealing device between coaxial shafts in a turbomachine to simplify the docking operation between the two shafts and discloses a device that can be adapted to any turbomachine environment.

The sealing device between two axisymmetric coaxial parts according to the invention may also have one or more of the following characteristics, considered individually or in any technically possible combination:
- said notch is a dovetail.

said two holding means have shoulders adapted to hold said annular spacer in the radial direction;

said annular segment is made of carbon;

said annular segment is made of metal.

Another purpose of the invention is a turbomachine comprising a low pressure rotor and a high pressure rotor characterised in that it comprises a sealing device according to the invention to seal a chamber between the low pressure shaft and the high pressure shaft.

Another purpose of the invention is a method of docking two axisymmetric coaxial parts comprising a sealing device according to the invention adapted to seal a chamber between said two axisymmetric parts, said method comprising steps consisting of:

assembling said sealing device onto the inner axisymmetric part, assembly of said device positioning said annular segment in a position called the pre-holding position in which the outside diameter of said annular segment is larger than the inside diameter of said reaming in the external axisymmetric part and in which the central axis of said elastic segment is offset from the central axis of said annular spacer;

docking said internal axisymmetric part with the external axisymmetric part, said external axisymmetric part having an engagement cone adapted to disengage said elastic segment from its pre-holding position and to progressively compress said annular segment in a position called the docked position, in which the outside diameter of said annular segment is equivalent to the inside diameter of said reaming in the external axisymmetric part and in which the central axis of said elastic segment and the central axis of said annular spacer are coincident when the two axisymmetric parts are docked.

Advantageously, the two axisymmetric coaxial parts are two coaxial rotating shafts or two coaxial rotating shafts of a turbomachine.

BRIEF DESCRIPTION OF THE FIGURES

Other characteristics and advantages of the invention will become clearer after reading the following description given for guidance and that is in no way limitative, with reference to the appended figures among which:

FIG. 1, already described, diagrammatically shows a sealing device between coaxial shafts according to the state of the art, to isolate a chamber between a low pressure shaft and a high pressure shaft of a turbomachine;

FIG. 2 diagrammatically shows a view along a longitudinal section plane of a sealing device between coaxial shafts according to the invention, pre-positioned on an inner shaft before docking of the inner shaft with an outer shaft of a turbomachine;

FIG. 3 shows a view along section plane A-A shown in FIG. 2 of the sealing device according to the invention;

DETAILED DESCRIPTION OF AT LEAST ONE EMBODIMENT

Figure 4A:
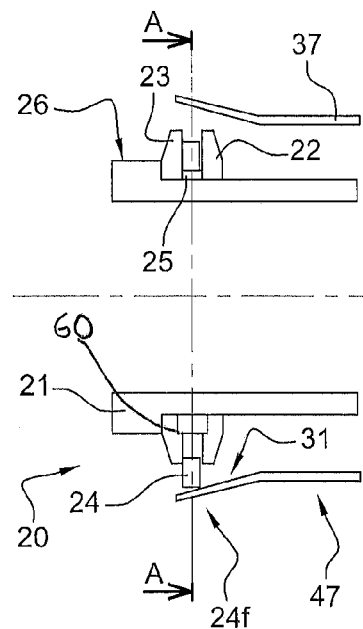
FIGS. 4a, 4b, 4c show an assembly sequence along a longitudinal section plane diagrammatically showing the behaviour of the sealing device according to the invention in different docking steps.

Elements common to all figures have the same reference numbers unless mentioned otherwise.

FIG. 2 and FIG. 3 show a sealing device 20 of the carbon seal type comprising:

an annular-shaped elastic segment 24 comprising an angular opening; two metal bearing surfaces 22 and 23 fixed to an internal rotating shaft 21, in the example shown in FIGS. 2 to 5, the internal rotating shaft 21 is the high pressure shaft of the turbomachine (not shown); the metal contact surfaces 22, 23 form the holding means to limit axial displacements of the annular elastic segment 24 while allowing an operating clearance J;

an annular spacer 25 fixed to the high pressure shaft 21 in order to hold the two metal contact surfaces 22 and 23 at a distance from each other during operation of the turbomachine; the annular spacer 25 has a notch 27 around its peripheral rim.

The inner shaft 21 has an annular positioning stop 26 that facilitates assembly and positioning of the sealing device 20 on the inner shaft 21. The elastic segment 24 is a carbon or metallic segment.

The annular segment 24 has a special shape at each of its free ends, forming hooking means 28a and 28b the shape of which is adapted to cooperate with the notch 27 of the annular spacer 25. According to one non-limitative embodiment, the notch 27 is in the shape of a dovetail and the hooking means 28a and 28b form hooks adapted to cooperate with the dovetail shape of the notch 27.

When the hooking means 28a, 28b are engaged in the notch 27, the annular segment 24 is held in a position called the pre-holding position in which the annular segment 24 is radially more compressed than in its so-called free position, and in which the central axis of the annular segment 24 is offset from the central axis of the sealing device 20 (i.e. the rotation axis of the annular spacer 25, the metal bearing surfaces 22, 23) corresponding to the axis of the rotation axis of the two rotating shafts.

Thus, when the two hooking means 28a, 28b cooperate with the notch 27, the annular segment 24 is held in position by the elastic return phenomenon. Holding in position by engagement of hooking means 28a and 28b with the notch 27 thus avoids the annular segment 24 from returning to its free position in which the outside diameter of the annular segment is larger than the outside diameter of the segment in its pre-holding position.

Thus, before the two coaxial rotating shafts are docked, the annular segment 24 is pre-held in position by elastic return in a position more compressed than its free state and in an off-centred position relative to the sealing device 20. Pre-holding the annular segment 24 in position eliminates the need to use an additional holding means specific to the docking step of the two shafts 21, 47 that would have to be removed after the two coaxial shafts have been docked.

The offset of the annular segment 24 facilitates insertion of the segment in the reaming of the sealing end plate 37 during docking while recentring and automatically positioning the segment during docking.

Pre-holding the annular segment 24 also assures that the annular segment 24 will not be damaged or broken during the docking step of the two shafts 21, 47.

To achieve this, FIGS. 4a, 4b, 4c and 5a, 5b, 5c show the behaviour of the sealing device 20 when docking the high pressure inner shaft 21 and the low pressure outer shaft 27 of a turbomachine.

Figure 5A:
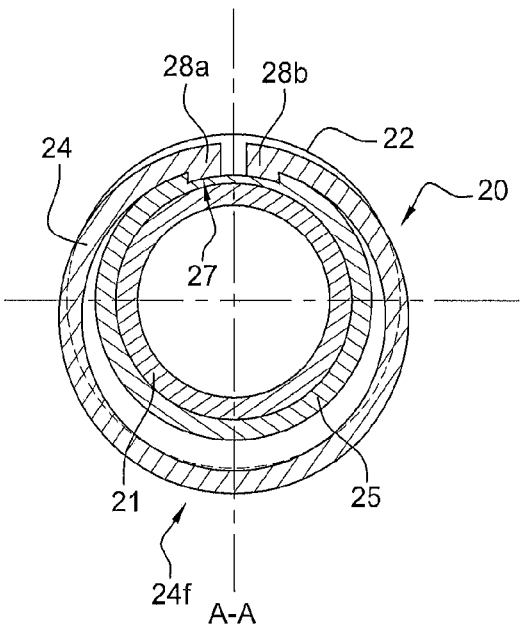
FIGS. 5a, 5b and 5c show views along section planes A-A shown in FIGS. 4a, 4b, 4c of the sealing device according to the invention in the different docking steps shown in FIGS. 4a, 4b and 4c.

During docking of the shafts 21 and 47, shown in FIGS. 4a and 5a, a portion of the external peripheral part 24f of the annular segment 24 will come into contact with an engagement cone 31 of the sealing end plate 37 of the outer shaft, corresponding to the low pressure shaft of a turbomachine in the example embodiment. The portion of the annular segment 24 that comes into contact with the engagement cone 31 is diametrically opposite the hooking means 28a, 28b. The engagement cone 31 is configured to progressively bring the annular segment into its compressed position called the docked position.

Figure 4B:
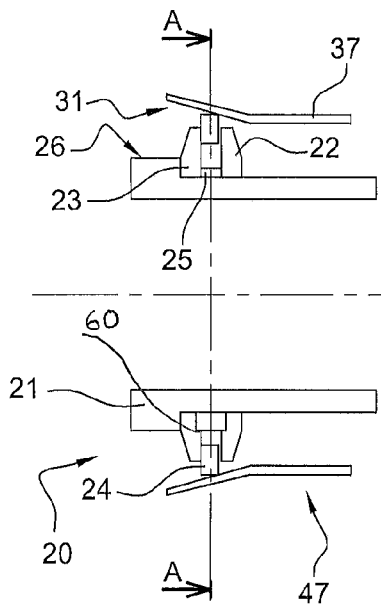

Progressive contact of a portion of the annular segment 24 in the offset position with the engagement cone 31 will slightly compress the annular segment 24 such that the docking means 28a, 28b will disengage from the notch 27. The annular segment 24 will therefore expand inside the reaming of the sealing end plate 37 by elastic return and will be recentred relative to the rotation axis of the rotating shafts as shown in FIGS. 4b and 5b.

In this position, the entire external peripheral wall 24f of the segment 24 is in contact with the engagement cone 31.

Figure 5B:
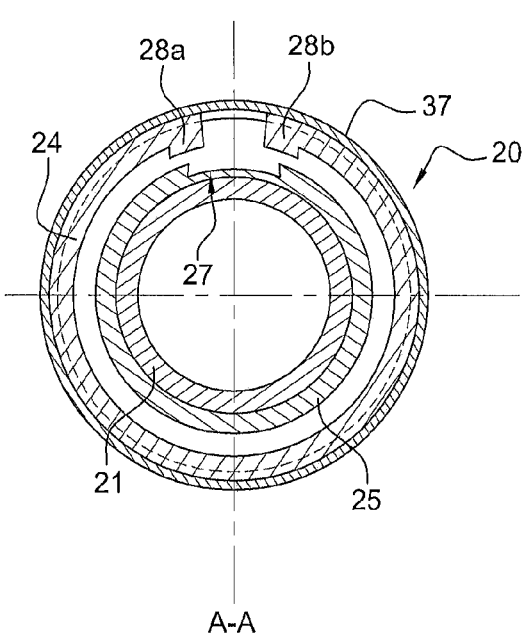

Starting from this moment, docking of the two shafts will progressively bring the annular segment 24 into a more compressed state than that shown with reference to FIGS. 5a and 5b, until reaching the docked position of the annular segment.

Figure 4C:
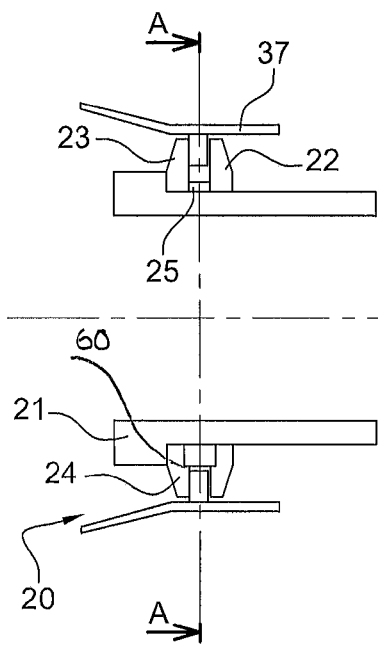
Figure 5C:
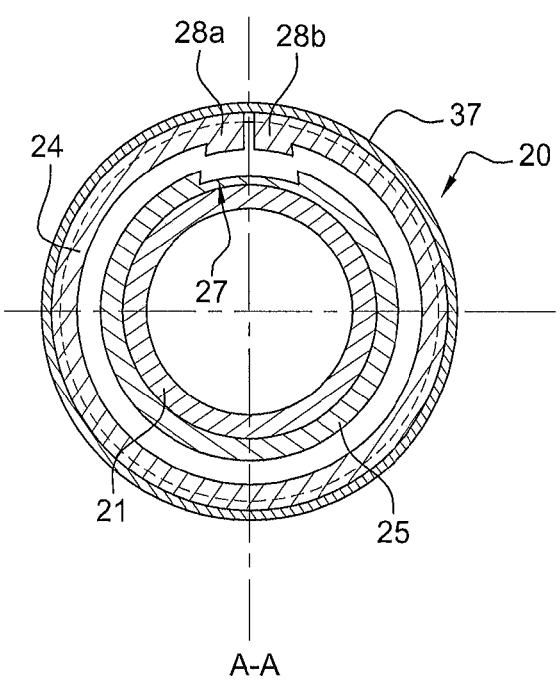

FIGS. 4c and 5c show the sealing device in position when the two rotating shafts have been docked.

Since the diameter of the reaming of the sealing end plate 37 of the outer shaft 47 is less than the diameter of the annular segment 24 in its free state and in its pre-held state, docking of the two shafts 21, 47 constrains the annular segment 24 even further so as to guarantee solid contact between the annular segment 24 and the sealing end plate 27.

The shape and the width of the hooking means 28a, 28b and the shape and position of the notch on the spacer are determined so as to create an offset and to be sure that a portion of the external peripheral part 24f of the segment 24 comes into contact with the engagement cone 31 during docking of the two rotating shafts. As a result, docking takes place without any risk of damage to the carbon annular segment 24.

Depending on the layout, it may be necessary to reduce the diameter of the spacer, which can cause some difficulties in centrifugal strength. In order to overcome this problem, it is planned to form shoulders 60 in metallic contact surfaces in which the spacer is inserted so as to hold the spacer in position radially during rotation of the shafts.

The invention has been described mainly with a high pressure shaft and a low pressure shaft of a turbomachine; however, the invention is also equally applicable to other coaxial rotating shafts.

The device according to the invention is particularly suitable for use with two counter rotating shafts; however, the invention is also applicable with two co-rotating shafts.

The invention has been disclosed particularly with respect to two rotating shafts of a turbomachine; however, the invention is also applicable to all axisymmetric coaxial parts, for example such as a rotor and a stator.

The invention claimed is:

1. A sealing device between two axisymmetric coaxial parts, said device including:
    an annular elastic segment with an angular opening;
    two holding elements located on each side of said annular segment and adapted to hold said segment in position axially while allowing a limited axial displacement; and
    an annular spacer arranged between said two holding elements and adapted to hold said two holding elements at a given spacing;
    wherein said annular spacer has a notch around its peripheral rim; and
    wherein said annular elastic segment has a hooking element at each of its free ends adapted to cooperate with said notch of said annular spacer, and to hold said elastic segment in a pre-holding position by elastic return force, in which an outside diameter of said elastic segment is less than the outside diameter of said elastic segment when the elastic segment is in its free state and in which a central axis of said elastic segment is offset from the central axis of said annular spacer.

2. The sealing device between two axisymmetric coaxial parts, according to claim 1, wherein said notch is a dovetail.

3. The sealing device between two axisymmetric coaxial parts, according to claim 1, wherein said two holding elements have shoulders adapted to hold said annular spacer in the radial direction.

4. The sealing device between two axisymmetric coaxial parts, according to claim 1, wherein said annular segment is made of carbon.

5. The sealing device between two axisymmetric coaxial parts, according to claim 1, wherein said annular segment is made of metal.

6. A turbomachine comprising a low pressure rotor and a high pressure rotor and a sealing device according to claim 1 to seal a chamber between a low pressure shaft and a high pressure shaft.

7. The sealing device between two axisymmetric coaxial parts, according to claim 1, wherein the two axisymmetric coaxial parts are two rotatable shafts of a turbomachine.

8. A method of docking two axisymmetric coaxial parts comprising a sealing device according to claim 1 adapted to seal a chamber between said two axisymmetric parts, said method comprising:
    assembling said sealing device onto an inner axisymmetric part, assembly of said device positioning said annular segment in a pre-holding position in which the outside diameter of said annular segment is larger than an inside diameter of said reaming in an external axisymmetric part and in which the central axis of said elastic segment is offset from the central axis of said annular spacer;
    docking said inner axisymmetric part with the external axisymmetric part, said external axisymmetric part having an engagement cone adapted to disengage said elastic segment from its pre-holding position and to progressively compress said annular segment in a docked position, in which the outside diameter of said annular segment is equivalent to the inside diameter of said reaming in the external axisymmetric part and in which the central axis of said elastic segment and the central axis of said annular spacer are coincident when the two axisymmetric parts are docked.

9. The docking method according to claim 8, wherein the two axisymmetric coaxial parts are two coaxial rotating shafts.

10. The docking method according to claim 8, wherein the two axisymmetric coaxial parts are two coaxial rotating shafts of a turbomachine.

* * * * *